July 19, 1938.  A. AMES, JR., ET AL  2,124,457
TESTING EYES
Filed Oct. 25, 1934   2 Sheets-Sheet 1
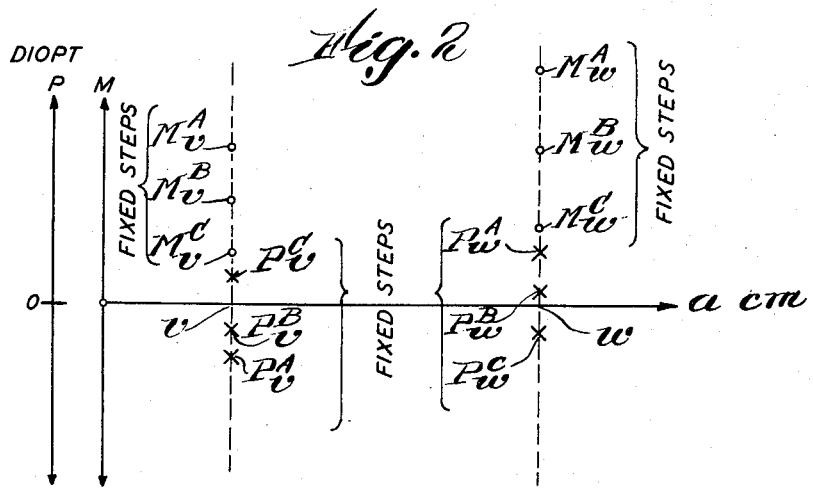
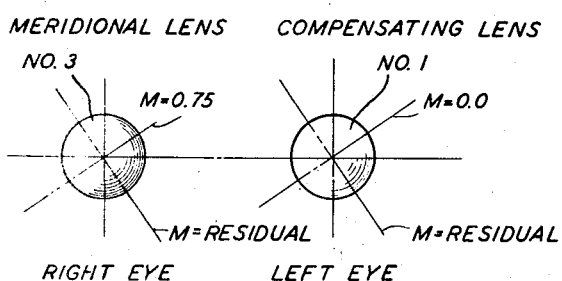
Inventors;
Adelbert Ames Jr.,
Gordon H. Gliddon,
by Roberts, Cushman & Woodbury
Attys.

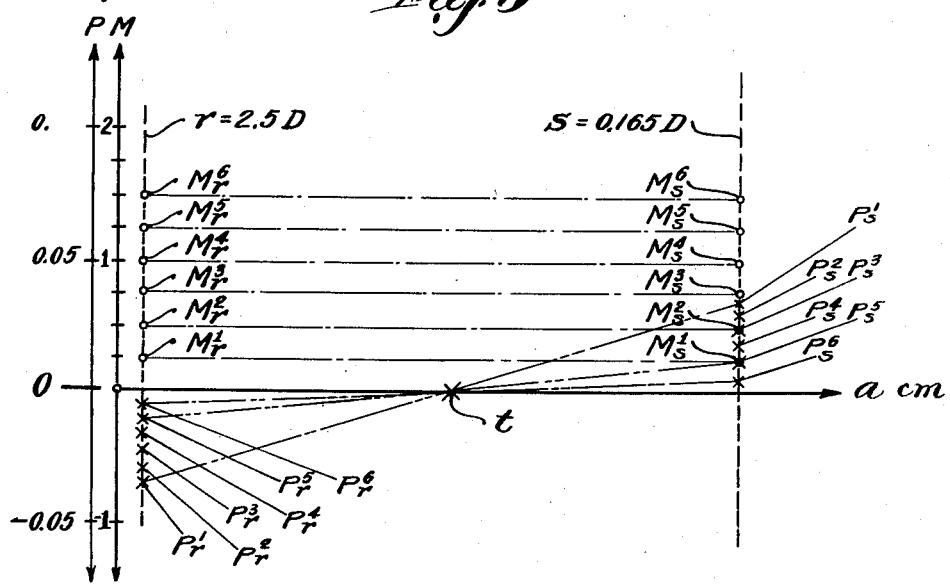
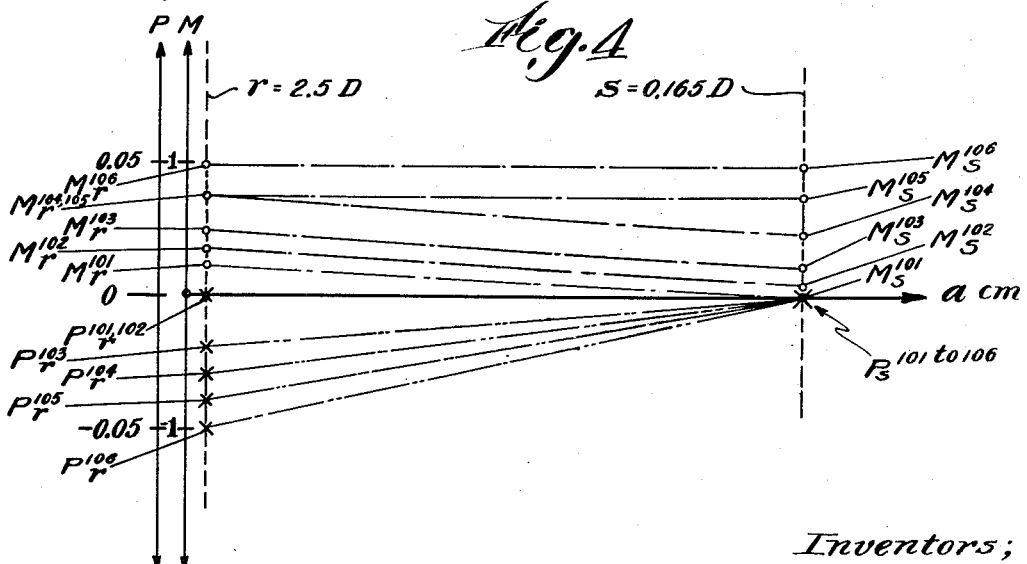

Patented July 19, 1938

2,124,457

UNITED STATES PATENT OFFICE 2,124,457

TESTING EYES

Adelbert Ames, Jr., and Gordon H. Gliddon, Hanover, N. H., assignors to Trustees of Dartmouth College, Hanover, N. H., a corporation of New Hampshire Application October 25, 1934, Serial No. 749,948

5 Claims. (Cl. 88—20)

The present invention deals with lens sets for the correcting or evaluating, especially for testing purposes of so-called eikonic defects of the eyes, or aniseikonia, which involve binocular vision as affected by discrepancies of the ocular images, the latter term being used to describe the impression formed in the higher brain centers through the vision of one eye. It is determined not only by the properties of the dioptric image that is formed in the retina of the eye, but also by the modifications imposed upon that image by the anatomical properties and physiological processes by which this image is carried to the higher brain centers.

Such lens sets are of particular importance for use in connection with instruments dealt with in our Letters Patent No. 1,944,871 of January 30, 1934 entitled "Clinical optical mensuration method and instrument" and in Letters Patent No. 1,954,399 of April 10, 1934 to Adelbert Ames, Jr. entitled "Eye testing instrument and method", and in copending applications Serial Nos. 618,200 filed June 20, 1932 and 706,523 filed January 13, 1934.

Certain terms used in the above mentioned disclosures and in the present specification and claims have the following meaning. "Eikonic" is the term used to describe the conditions which have to do with the size and shape of the ocular images. "Iseikonic" is that condition in which the size and shape of the ocular images are equal. "Aniseikonia" is that condition in which the size or shape, or both, of the ocular images are unequal. It can be divided in two types; one involving overall difference, in which one image is larger than the other in all meridians, and another one involving meridional differences in which one image is larger than the other in one meridian.

As explained in these disclosures, tests on such instruments comprise the measurement and compensation of eikonic defects with the aid of lenses which change the size of the ocular images, preferably without affecting the vergence of the image bearing rays or, in other words, without optical power in the commonly used meaning of that term. If such lenses, for some reason, are not pure magnification lenses, they should at least have a known power that can be conveniently compensated while testing, or otherwise allowed for when dealing with the eikonic conditions of a patient.

Any investigation of eikonic conditions must take into account the facts that they may vary with varying visual distances, and that they involve not only overall differences in the size of the ocular images but also so-called shape differences the most important ones of which are symmetric to a so-called eikonic meridian. Hence, the investigator should have at his disposal means for changing the size or shape, or both, of ocular images by known degrees conveniently stepped, and either the light vergence should not be changed, or changed to a predetermined degree that can be easily taken into account.

When first dealing with the investigation of eikonic phenomena, we used two sets of lenses, one for near vision (at approximately 2.5 diopters of 40 cm.) and another one for distant vision (at approximately 0.165 diopter or 6 m., which distance is for practical purposes equivalent to infinity), each set comprising a series of spherical lenses producing, at the distance for which it was to be used, overall magnifications at convenient steps of approximately .25% angular magnification without change of vergence, and another series with similar characteristics but having cylindrical surfaces effecting meridional magnification. By vergence we mean the amount to which the light rays coming from an object point are either diverged or converged when entering the eye.

However, we found it rather disadvantageous to use two sets of lenses for the two test distances, mainly because of the necessary frequent, and sometimes confusing, changes from one set to the other. Also, the large number of lenses renders such a trial set for eikonic tests expensive and bulky.

To overcome these and related drawbacks is the purpose of the present invention, some of whose objects are therefore the testing of eyes for eikonic conditions at different visual distances with a single set of trial lenses, and to provide trial lens sets suited for testing such conditions at various distances.

These and other aspects and objects of our invention will be apparent from the following explanation describing two illustrative embodiments thereof exemplifying its genus. The description refers to drawings in which:

Fig. 1 is a schematical drawing explaining the terminology of the description;

Fig. 2 is a diagram showing the principle of the invention generally;

Figs. 3 and 4 are similar diagrams giving the data of two practical embodiments of the invention;

Fig. 5 is a section through an individual of a lens set according to the invention; and Fig. 6 is a diagrammatic representation of the compensation of residual magnification.

According to the invention, we use a lens set whose individual lenses have at different predetermined visual distances predetermined magnifications in convenient steps and, at these distances, predetermined powers, which may be zero or other values especially selected, according to our invention, to facilitate the evaluation and correction of eikonic defects with the aid of the specified magnification properties of the lenses.

As herein used, the terms power and magnification are defined as follows, referring to Fig. 1:

If N is a point of reference, as for example the nodal point of an eye, O an object, I the image of O produced by optical element L, $a$ the object distance, $b$ the image distance, $\alpha$ the angle subtended at N by rays coming from the object and $\beta$ the corresponding image angle, the power P can be expressed by $$P = \frac{1}{a} - \frac{1}{b}$$

and the angular magnification $$M \text{ by } M = \frac{\alpha}{\beta}$$

or in percent, $$m\% = \left(\frac{\alpha}{\beta} - 1\right) \times 100.$$

The above given general principle of our invention may be better understood by referring to Fig. 2, which indicates, in a system of Cartesian coordinates, the relations of object distance (that is the visual distance of the test), magnification and power of each lens of a series. The distances are plotted in cm as abscissas, and magnification M and power P as ordinates, in percent and diopters respectively. Thus, the individual lenses of a set according to our invention, if, for example, they are to be used at distances $v$ and $w$, (assuming for the sake of simplicity that there are only three lens individuals, A, B, and C) have at these distances predetermined magnifications $$M_v^A, M_w^A, M_v^B, M_w^B, M_v^C, M_w^C,$$

and selected powers $$P_v^A, P_w^A, P_v^B, P_w^B, P_v^C, P_w^C.$$

The relation of magnifications and powers of the lens individuals should be chosen to suit practical requirements at hand, and two examples of lens sets according to our invention, which we have found especially suitable for the tests above referred to, will now be given.

In the example graphically shown in Fig. 3, the magnifications are graded in similar steps of 0.25%, from zero to 5%. The powers are so calculated that all lens individuals have zero power at an intermediate distance $t$ of approximately 74 cm. (1.35 D), which results at $r=40$ cm. (reading distance) and at $s=600$ cm. (practically equivalent to infinite) in powers of values given in the following Table I, the terminology of this table and of the following tables being given in Fig. 5, where $R_a$ and $R_b$ are the radii of the surfaces of a lens, and $d$ is its thickness.

TABLE I

| Lens No. | M in percent at 0.165D | $d$ in mm. | $R_a$ in mm. | $R_b$ in mm. | P in diopters | |
|---|---|---|---|---|---|---|
| | | | | | 0.164D | 2.5D |
| 1 | 0.25 | 1.21 | 215.00 | 215.13 | 0.005 | −0.006 |
| 2 | 0.50 | 1.22 | 95.00 | 94.80 | 0.011 | −0.011 |
| 3 | 0.75 | 1.08 | 53.15 | 52.89 | 0.018 | −0.017 |
| 4 | 1.00 | 1.39 | 51.44 | 51.09 | 0.024 | −0.023 |
| 5 | 1.25 | 1.68 | 49.96 | 49.54 | 0.030 | −0.029 |
| 6 | 1.50 | 1.97 | 48.85 | 48.35 | 0.035 | −0.035 |
| 7 | 1.75 | 2.26 | 48.05 | 47.45 | 0.041 | −0.040 |
| 8 | 2.00 | 2.55 | 47.43 | 46.77 | 0.048 | −0.046 |
| 9 | 2.25 | 2.83 | 46.93 | 46.21 | 0.053 | −0.052 |
| 10 | 2.50 | 3.11 | 46.34 | 45.53 | 0.060 | −0.058 |
| 11 | 2.75 | 3.39 | 45.98 | 45.11 | 0.066 | −0.064 |
| 12 | 3.00 | 3.65 | 45.55 | 44.60 | 0.072 | −0.070 |
| 13 | 3.50 | 4.18 | 44.80 | 43.71 | 0.084 | −0.082 |
| 14 | 4.00 | 4.70 | 44.27 | 43.04 | 0.096 | −0.094 |
| 15 | 4.50 | 5.18 | 43.47 | 42.10 | 0.108 | −0.106 |
| 16 | 5.00 | 5.66 | 42.90 | 41.40 | 0.121 | −0.118 |

The same values for the first six individuals numbered one to six are indicated in Fig. 3 with corresponding lens numbers used as superscripts for M and P, whereby it should be noted that the lines connecting the M and P values of any individual for distances $r$, $s$, (these letters being correspondingly applied as subscripts of M and P) and $t$ do not necessarily furnish corresponding values for other distances but are mainly drawn in order to facilitate the understanding of the construction of the set by correlating the data of each individual lens thereof.

The powers at 40 and 600 cm. vary so little from the zero value at 74 cm., that they may be neglected except in some of the lenses of higher magnification, above about 2%.

These lenses have been calculated by conventional and error ray tracing methods, which are familiar to anyone skilled in the art of designing lenses (as indicated in our Patent No. 1,933,578 of November 7, 1933) and are therefore not repeated herein. All lenses of this example are calculated for a distance of 23 mms. from the nodal point to the front lens surface.

As mentioned before, sets for both overall and meridional magnification should be provided. The lenses of the overall magnification set have the above data in every meridian, whereas those of the corresponding meridional magnification set are ground with cylindrical surfaces with the curves given in Table I in one meridian and plano curves in the meridian perpendicular thereto.

When these meridional size lenses are used for tests at 40 cm. visual distance, they produce a certain magnification in the zero curvature meridian perpendicular to the meridian having the specified magnification, which magnification may be referred to as "residual" and can not always be neglected. We have found, however, that it can be compensated by placing before the other eye an auxiliary lens which has the residual magnification in a meridian placed parallel to the zero curvature meridian of the main lens, and zero magnification in the meridian perpendicular thereto. This arrangement is shown in Fig. 6, where a meridional size defect of 0.75 of the right eye is indicated as corrected by a lens No. 3 which, however, has a residual magnification in the meridian perpendicular to the corrected meridian. This residual magnification is compensated by means of a No. 1 lens before the left eye, which lens has a compensating magnification in the meridian of the residual magnification and no magnification in the meridian perpendicular thereto.

It is not necessary to have an auxiliary compensating lens for each lens of the meridional sets, but one auxiliary lens can be used for a group of meridional test lenses. Table II below gives the characteristics of an auxiliary set suitable for use with the trial set of Table I.

If desired, the power of the lenses of higher magnification can be compensated with an auxiliary lens set comprising lens individuals having the powers listed in Table I, preferably only for the lenses from No. 8 upward.

TABLE II

Compensating lenses

| Lens No. | Meridional lenses to be compensated | d in mm. | $R_a$ in mm. | $R_p$ in mm. |
|---|---|---|---|---|
| 21 | 0.25%—1.50% | 1.387 | 382.873 | 386.268 |
| 22 | 1.75%—2.75% | 2.834 | 382.873 | 386.268 |
| 23 | 3.00%—3.75% | 4.177 | 382.873 | 386.268 |
| 24 | 4.00%—5.00% | 5.178 | 382.873 | 386.268 |

TABLE III

Overall magnification

| Lens No. | M in percent 0.164D | M in percent 2.5D | P at 2.5D | d in mm. | $R_a$ in mm. | $R_p$ in mm. |
|---|---|---|---|---|---|---|
| 101 | 0.00 | 0.25 | 0.00 | 2.91 | 0.00 | 0.00 |
| 102 | 0.12 | 0.37 | 0.00 | 3.18 | 1069.53 | 1069.53 |
| 103 | 0.25 | 0.50 | −0.02 | 3.45 | 514.76 | 513.75 |
| 104 | 0.50 | 0.75 | −0.03 | 4.00 | 288.79 | 287.68 |
| 105 | 0.75 | 0.75 | −0.04 | 1.65 | 77.04 | 76.50 |
| 106 | 1.00 | 1.00 | −0.05 | 2.20 | 77.22 | 76.50 |
| 107 | 1.25 | 1.25 | −0.06 | 2.75 | 77.30 | 76.50 |
| 108 | 1.50 | 1.50 | −0.07 | 3.30 | 77.57 | 76.50 |
| 109 | 1.75 | 1.75 | −0.08 | 3.85 | 77.75 | 76.50 |
| 110 | 2.00 | 2.00 | −0.09 | 4.40 | 77.93 | 76.50 |
| 111 | 2.25 | 2.00 | −0.10 | 2.35 | 36.55 | 35.77 |
| 112 | 2.50 | 2.25 | −0.11 | 2.84 | 40.21 | 39.26 |
| 113 | 2.75 | 2.50 | −0.12 | 3.35 | 43.24 | 42.12 |
| 114 | 3.00 | 2.75 | −0.14 | 3.87 | 45.91 | 44.62 |
| 115 | 3.50 | 3.00 | −0.15 | 2.58 | 26.29 | 25.42 |
| 116 | 4.00 | 3.50 | −0.18 | 3.56 | 31.91 | 30.72 |
| 117 | 4.50 | 4.00 | −0.20 | 4.49 | 35.96 | 34.46 |

TABLE IV

Meridional lenses

| Lens No. | M in % | d in mm. | $R_p$ in mm. | $R_a$ in mm. | Dioptric properties at 2.5D | | |
|---|---|---|---|---|---|---|---|
| 201 | 0.25 | 3.57 | 533.13 | 534.22 | −0.02C ax of mag | 0.25S | 0.25C |
| 202 | 0.50 | 4.23 | 305.13 | 306.38 | −0.03C ax of mag | 0.37S | 0.37C |
| 203 | 0.75 | 4.89 | 232.44 | 233.90 | −0.04C ax of mag | 0.37S | 0.62C |
| 204 | 1.00 | 2.58 | 90.00 | 90.83 | −0.05C ax of mag | 0.25S | 0.75C |
| 205 | 1.25 | 3.23 | 90.00 | 91.05 | −0.06C ax of mag | 0.25S | 1.00C |
| 206 | 1.50 | 3.87 | 90.00 | 91.26 | −0.07C ax of mag | 0.37S | 1.12C |
| 207 | 1.75 | 4.52 | 90.00 | 91.46 | −0.08C ax of mag | 0.37S | 1.37C |
| 208 | 2.00 | 2.41 | 41.66 | 42.47 | −0.09C ax of mag | 0.25S | 1.50C |
| 209 | 2.25 | 3.10 | 47.68 | 48.71 | −0.10C ax of mag | 0.25S | 1.75C |
| 210 | 2.50 | 3.79 | 52.51 | 53.76 | −0.11C ax of mag | 0.37S | 1.87C |
| 211 | 2.75 | 4.48 | 56.46 | 57.94 | −0.12C ax of mag | 0.37S | 2.12C |
| 212 | 3.00 | 2.44 | 28.06 | 28.88 | −0.13C ax of mag | 0.25S | 2.25C |
| 213 | 3.50 | 3.84 | 37.91 | 39.19 | −0.15C ax of mag | 0.37S | 2.62C |
| 214 | 4.00 | 5.25 | 45.41 | 47.16 | −0.18C ax of mag | 0.50S | 3.00C |

It will now be evident that a lens set of this type can well be used for evaluating magnifications at two different distances, it being comparatively simple to take into account the powers for magnifications higher than approximately 2%, which magnifications do not occur very frequently, and to compensate meridional lenses as explained above. It will be understood that these power values and the auxiliary magnification lenses can be easily listed in simple tables for ready reference or indicated on the handles of the respective individuals.

If, however, it is less desirable to have the same magnification at the two distances, but preferable to simplify the accounting for power and to have no residual magnification in the meridional set for one distance, the following embodiment of our invention is preferable.

This second example, graphically indicated in Fig. 4 in a manner quite similar to that used in Fig. 3, is a lens set where each lens is not defined as producing equal magnifications at two distances, but where the magnifications for both distances may vary in even steps, with the powers zero for one distance and for the other distance stepped in even steps. The characteristics of a set of this type are given below in Tables III and IV, for spherical and cylindrical lens sets, respectively:

These lens data have also been obtained by conventional methods, the spherical individuals being designed for a distance of 40 mms. from nodal point to front lens surface, and the meridional lenses for a corresponding distance of 45 mms.

When this set is employed, the clinician can use its individuals for tests at the visual distance of 600 cm. without consideration of any power effect. When performing near vision tests, he takes into account even power values which may be listed in a table or marked on the lens handles.

No compensating lenses are necessary with the meridional lenses when used for distance vision, whereas for near vision, a residual magnification may be compensated as explained above for the first example.

It should be understood that the present disclosure is for the purpose of illustration only and that this invention includes all modifications and equivalents which fall within the scope of the appended claims.

We claim:

1. A set of lenses for testing, substantially unaffected by dioptric power effects, the ocular image size properties of eyes for two object distances, one for near and one for distant vision, by placing before the respective eyes trial lenses in holders substantially determining the distances of said lenses from the respective eye, comprising a series of principal trial lens elements each having a thickness, and surfaces with curvatures in one meridian to produce a lens effecting in said meridian at said distances certain magnifications and for certain object distances certain dioptric powers, the elements of said series having for said two object distances, respectively, magnifications stepped in certain prescription magnification values, having for at least one of said two object distances comparatively small dioptric powers stepped in certain prescription power values, and all elements having for a certain object distance zero dioptric power, and a series of auxiliary trial power lens elements each having a thickness and surfaces with curvatures in one meridian to produce a lens effecting for one of said two object distances a dioptric power substantially equal and opposite to the power of a corresponding element of said principal series, whereby an auxiliary element is to be placed in said holders in alignment with a principal element of equal but opposite power.

2. A set of lenses for testing, substantially unaffected by dioptric power effects, the ocular image size properties of eyes for two object distances, one for near and one for distant vision, by placing before the respective eyes trial lenses in holders substantially determining the distances of said lenses from the respective eye, comprising a series of principal trial lens elements each having a thickness, and surfaces with curvatures in one meridian and with different curvatures in a meridian normal thereto, to produce a cylindrical lens effecting in said first meridian at said distances certain magnifications and for certain object distances certain dioptric powers, the elements of said series having in said first meridian for said two object distances magnifications stepped in certain prescription magnification values, and all elements having in said first meridian for a certain object distance zero dioptric power, and effecting for at least one of said two object distances in said second meridian zero power and certain residual magnifications; and a series of auxiliary trial lens elements each having a thickness and surfaces having in two normal meridians curvatures to produce a cylindrical lens effecting in one meridian a magnification substantially equal to said residual magnification of a corresponding element of said principal series, and having in the other meridian substantially zero magnification, whereby any one principal element is to be used before one eye with an auxiliary lens of equal residual magnification before the other eye.

3. A set of lenses for testing, substantially unaffected by dioptric power effects, the ocular image size properties of eyes for two object distances, one for near and one for distant vision, by placing before the respective eyes trial lenses in holders substantially determining the distances of said lenses from the respective eye, comprising a series of principal trial lens elements each having a thickness, and surfaces with curvatures in one meridian to produce a lens effecting in said meridian at said distances certain magnifications and for certain object distances certain dioptric powers, the elements of said series having for said two object distances magnification values equal for each element but stepped for different elements in certain prescription magnification values, having for at least one of said two object distances comparatively small dioptric powers stepped in certain prescription power values, and all elements having for a certain object distance zero dioptric power; and a series of auxiliary trial power lens elements each having a thickness and surfaces with curvatures in one meridian to produce a lens effecting for one of said different object distances a dioptric power substantially equal and opposite to the power of a corresponding element of said principal series, whereby an auxiliary element is to be placed in said holders in alignment with a principal element of equal but opposite power.

4. A set of lenses for testing, substantially unaffected by dioptric power effects, the ocular image size properties of eyes for two object distances, one for near and one for distant vision, by placing before the respective eyes trial lenses in holders substantially determining the distances of said lenses from the respective eye, comprising a series of trial lens element each having a thickness, and surfaces with curvatures in one meridian to produce a lens effecting in said meridian at said distances certain magnifications, and for certain object distances certain dioptric powers, the elements of said series having for said two object distances magnifications stepped in certain prescription magnification values, and having for one of said object distances zero dioptric power.

5. A set of lenses for testing, substantially unaffected by dioptric power effects, the ocular image size properties of eyes for two object distances, one for near and one for distant vision, by placing before the respective eyes trial lenses in holders substantially determining the distances of said lenses from the respective eye, comprising a series of trial lens elements each having a thickness, and surfaces with curvatures in one meridian to produce a lens effecting in said meridian at said distances certain magnifications, and for certain object distances certain dioptric powers, the elements of said series having for said two object distances magnifications stepped in certain prescription magnification values, having for one of said two object distances zero dioptric power, and for the other of said two object distances dioptric powers stepped in certain prescription power values.

ADELBERT AMES, Jr.
GORDON H. GLIDDON.